United States Patent [19]

Singh

[11] Patent Number: 5,074,110
[45] Date of Patent: Dec. 24, 1991

[54] COMBUSTION ENGINE

[76] Inventor: Satnarine Singh, 63 La Plaisance Road, La Romain, Trinidad and Tobago

[21] Appl. No.: 600,672

[22] Filed: Oct. 22, 1990

[51] Int. Cl.$^5$ .............................................. F02C 7/00
[52] U.S. Cl. ............................. 60/39.161; 60/39.54; 60/649
[58] Field of Search ............... 60/649, 674, 39.161, 60/39.54

[56] References Cited

U.S. PATENT DOCUMENTS

| | | | |
|---|---|---|---|
| 933,080 | 9/1909 | Lake | 60/39.54 X |
| 1,734,332 | 11/1929 | Hausotte | 60/39.54 X |
| 2,708,827 | 5/1955 | La Marche | 60/39.54 |

Primary Examiner—Allen M. Ostrager
Attorney, Agent, or Firm—Malloy, Downey & Malloy

[57] ABSTRACT

A combustion engine comprising of a piston and cylinder assembly wherein the cylinder receives hot gasses emitted from a combustion chamber, the hot gasses being generated from the combustion of any of a variety of combustible material included but not limited to wood, coal, dry vegetation, and sawdust. The hot gasses, once received in the cylinder, are subjected to a compression stroke during which water is injected therein to create steam from the compression of the hot gasses and injected water whereby the resulting energy of expansion of the steam within a greatly reduced volume will result in a power stroke of the piston causing efficient work to be delivered to a power takeoff structure such as a crank shaft or the like.

10 Claims, 1 Drawing Sheet

COMBUSTION ENGINE

BACKGROUND OF THE INVENTION

1. Field of the Invention

This invention relates to a combustion engine which is fueled by hot gasses emitted from combustible materials burning within a combustion chamber wherein the hot gasses are compressed with water in a piston and cylinder assembly to produce steam within a greatly reduced volume, the resulting useful work thereafter being delivered to a power takeoff due to energy of expansion from the expanding steam within the reduced volume.

2. Description of the Prior Art

The subject matter of this invention relates to a combustion engine which utilizes the hot gasses emitted from a combustion chamber from the burning of combustible materials therein. The combustible materials are the source of fuel which provide energy in the form of hot gas, and generally include but are not limited to wood, coal, dry vegetation, sawdust, waste products from farming, e.g. stalks from wheat and sugar cane, and any other waste products which can support combustion.

Presently, most combustion engines are fueled by fossil fuels such as coal, oil, or gas wherein the fossil fuel is burned to transform the energy into the form of steam or hot gas. These fossil fuels, when burned, emit a high level of carbon dioxide to the surrounding atmosphere resulting in a reduction of the air quality and damage to the environment. Further, burning of these fossil fuels results in the formation of oxygen oxides which are the main ingredient in the formation of smog in heavily congested metropolitan areas.

There is a continued concern throughout the world that the limited supply of fossil fuels such as oil, coal and gas will be depleted in the near future. Many large countries such as India and China have become largely industrialized but lack the necessary fuel supplies to operate their industrial plants. Further, the over population in these countries results in a high demand for fuel to operate automobiles, and with a limited supply, the extremely high price of oil and gas prohibits many individuals from owning or driving an automobile.

Accordingly, there is obviously a need in the international automotive industry as well as other fuel demanding industries for a combustion engine which can be fueled by any type of combustible material capable of being burned to create hot gasses. Further, there exists a need for a combustion engine which can be fueled by combustible materials which are recyclable in nature and emit a low level of nitrogen oxide when burned, thereby reducing the amount of pollutants emitted into the atmosphere.

SUMMARY OF THE INVENTION

The present invention is directed towards a combustion engine which is specifically designed to be fueled by hot gasses emitted from the burning of combustible materials within a combustion chamber. The present invention includes a piston and cylinder assembly wherein the cylinder is structured to receive hot gasses through an intake valve and once in the cylinder, the hot gasses are compressed while injecting water into the cylinder to produce a steam upon compression. The resulting energy of expansion of the steam produced in the greatly reduced volume of the cylinder during compression result in the piston being forced down thereby defining a power stroke. The power stroke results in work being delivered to a power takeoff structure such as a crank shaft which in turn may operate to apply driving power to a machine including but not limited to a motor vehicle.

The present invention uses combustible materials such as wood, dry vegetation, sawdust, and other waste products from farming as a source of fuel. These combustible materials are burned within a combustion chamber to produce hot gasses which are thereafter directed to a piston and cylinder assembly. The use of these combustible materials such as wood and dry vegetation result in a lower level of nitrogen oxide emitted to the atmosphere thereby reducing pollution and the formation of smog. In nature, plants absorb energy from the sun during growth and when burned, plants give up the energy which was stored therein in the form of heat. This heat energy is used in the present invention to provide combustion which produces steam resulting in a power stroke of the piston. The continuous cycle of growing, then burning vegetation to extract the energy, ensures that the level of carbon dioxide in the atmosphere remains constant.

The present invention is of particular importance for use in powering vehicles in remote locations such as a battle field where it is extremely difficult or impossible to obtain continuous petroleum fuel supplies. The combustion engine of the present invention would be useful in such a situation wherein a continuous supply of fuel could be obtained in the field using wood and other vegetation thereby allowing for a continuous supply.

Accordingly, the efficiency of the present invention is significantly higher than conventional internal combustion engines resulting in no loss of heat during cooling and lower exhaust temperatures wherein more energy is extracted.

BRIEF DESCRIPTION OF THE DRAWINGS

For a fuller understanding of the nature of the present invention, reference should be had to the following detailed description taken in connection with the accompanying drawings, in which.

DETAILED DESCRIPTION OF THE PREFERRED

Figure 1:
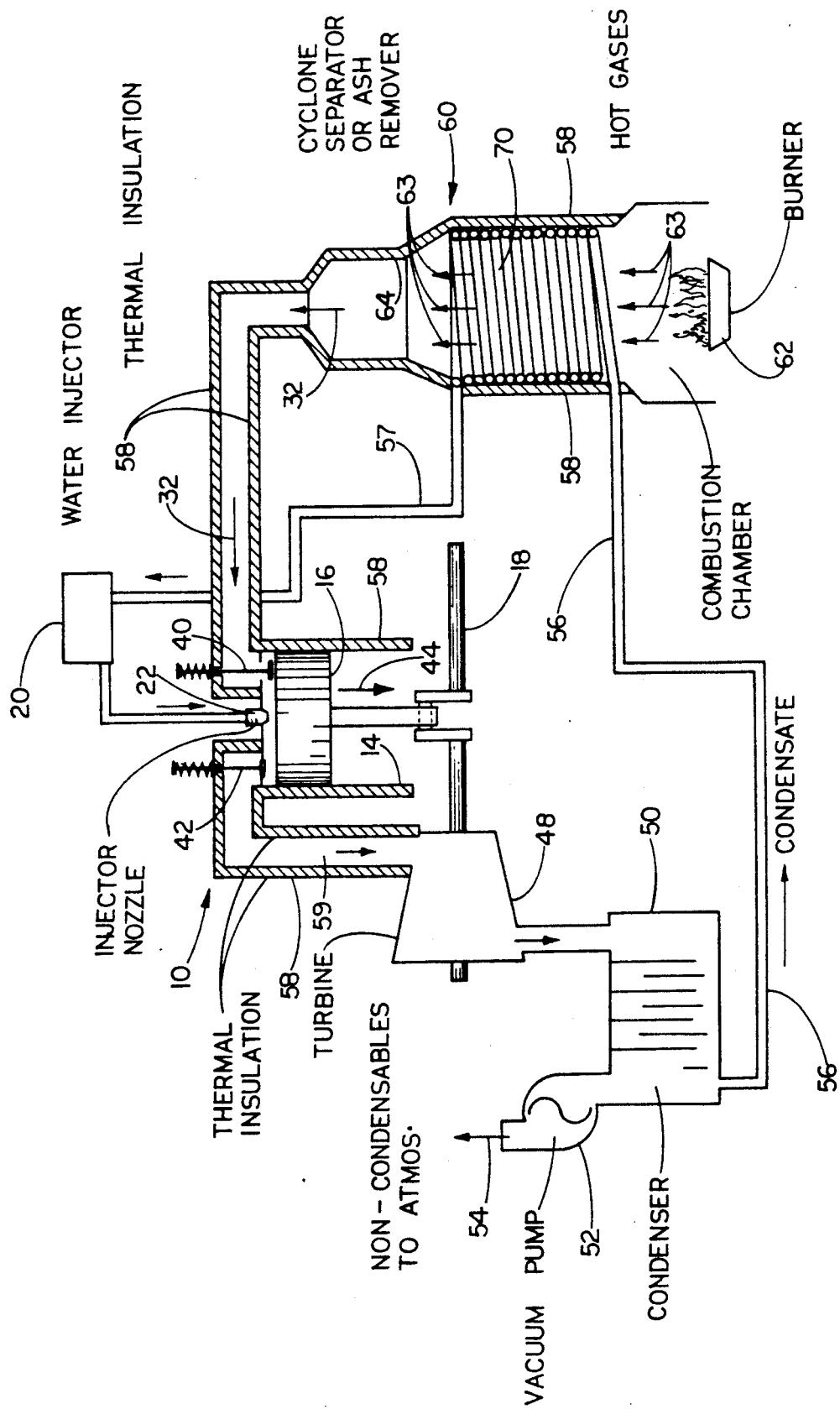
FIG. 1 is a schematic representation of the preferred embodiment of the present invention wherein hot gasses are created in a combustion chamber and supplied to the engine as shown.

As shown in FIG. 1, a schematic representation of a preferred embodiment of the present invention is represented wherein a portion of the system incorporating the subject combustion engine is generally represented as 10. This portion of the present invention includes a piston and cylinder assembly 12 including a cylinder 14 and a piston 16. The piston is connected to a power takeoff structure which in the preferred embodiment comprises a crank shaft 18. The subject combustion engine 10 further includes a water injector means 20 communicating directly with the interior of the cylinder 14 through an injection nozzle 22. A conventional water supply, which, in the preferred embodiment, is in constant recirculation, is connected to the water injection means 20.

With reference to FIG. 1, the operation of the external combustion engine 10 is based on the feeding or supply of hot exhaust gasses indicated by the directional arrows 32 from a combustion chamber 60 after combustion takes place. Combustion takes place in the combustion chamber by burning combustible materials such as wood, dry vegetation and other combustible materials in a burner tray 62. The heat from burning the combustible material is delivered in the form of hot gasses as indicated by the directional arrows 63 up through the housing portion of the combustion chamber as at 64 wherein the hot gasses, again as indicated by the directional arrows 63, are passed through a cyclone separator which removes ash or soot from the hot gas to prevent fouling of the piston and cylinder assembly.

Valve means including an intake valve assembly 40 and an exhaust valve assembly 42 cooperatively operate to regulate fluid flow into and out of the cylinder 14. In any event, the hot gasses 32 enter the cylinder 14 when the piston begins its inlet stroke. Both valves 40 and 42 then close as the piston travels upward into a compression stroke. Prior to reaching top dead center, the water injector means 20 is activated serving to force injected water in the form of spray into the cylinder 14 through an injection nozzle 22 causing the sprayed water to mix in with the hot gasses being compressed. The heat of the compression of the gasses combined with the elevated temperature of the hot gasses themselves will eventually cause the injected sprayed water from the water injector means 20 to be transformed into steam. The steam will thereafter continue to absorb radiant heat to the point of equilibrium at a given temperature in greatly reduced volume as the piston approaches the top dead center position as shown in FIG. 1. At top dead center, the energy of expansion will force the piston downwardly in accordance with the directional arrow 44 into a power stroke which will provide work to the power takeoff or crank shaft 18 as it is clearly obvious in the schematic representation of FIG. 1. After the power stroke has been completed, a typical exhaust stroke will then follow as exhaust valve 42 opens. The resulting steam and hot gas mixture will then be exhausted through the exhaust valve 42 into a duct 59 where it is directed to a turbine assembly 48. The turbine assembly is in operative and driving connection with the same power takeoff or crankshaft 18 and serves to increase the overall efficiency of operation of the entire combustion engine by utilizing what heat remains in the exhaust gas and steam mixture exiting from the exhaust valve 42 on the cylinder 14. After passing through the turbine 48, the exhaust gas thereafter passes to a condenser 50 for recapture of the water within the steam/hot gas mixture. A vacuum pump as at 52 is provided towards the upper, cooler end of the condenser so as to remove any non-condensables to the atmosphere as at 54. Such non-condensables will not be pollutant and, therefore, as set forth above, the need for a catalytic converter or other purification means associated with the conventional modern day automobiles will not be required.

The collected condensation is recirculated from the condenser 50 through conventionally structured conduits as at 56 back to a heating coil 70 which is in surrounding heat transferring relation to the combustion chamber and is specifically designed to permit heat from the combustion chamber to be transferred to the circulating water within the conduit 56. From the heating coil 70, the collected condensation is recirculated to the water injector 20 where it becomes part of the water supply to be injected into the cylinder 14. However, it should be noted that the engine can efficiently operate without the heating coil 70, wherein the injected water would initially be cold.

The hot gasses circulating through the combustion engine between the combustion chamber, cylinder, and turbine are normally directed through ducts 59. The entire outer exposed surfaces of the combustion chamber, cyclone separator, cylinder, and ducts are wrapped with a layer of thermal insulation 58 to prevent heat from escaping from within the interior portions of the engine.

Now that the invention has been described,
What is claimed is:

1. A combustion engine for use in combination with a source of hot gas comprising:
   a. a piston and cylinder assembly including a piston reciprocally mounted within a cylinder and secured in driving engagement with a power takeoff,
   b. said cylinder connected in fluid communication with said source of hot gas and further including valve means mounted thereon and structured for regulating fluid flow into and out of said cylinder,
   c. water injection means connected to a water supply and to said cylinder and structured for the injection of water into said cylinder during compression of hot gasses therein by said piston,
   d. exhaust means interconnected to said cylinder by said valve means and structured for removing exhaust fluid from said cylinder after compression of a combination of said hot gas and steam converted from water injected from said water injection means,
   e. a resulting power stroke defined by displacement of said piston into driving relation with said power takeoff upon expansion and transformation of said injected water into steam,
   f. a combustion chamber defining said source of hot gas and including a burner tray structured and configured to hold combustible material during burnoff thereof,
   g. a turbine assembly for use in combination with said combustion engine and connected to said exhaust means, said turbine assembly driven by hot exhaust fluid removed from said cylinder and connected in driving relation to said power takeoff serving to drive said power takeoff along with said piston during the power stroke thereof,
   h. a condenser connected to a fluid takeoff portion of said turbine and connected in fluid communication with said water supply, said condenser structured to direct condensate to said water supply, and
   i. a heating coil disposed in heat transferring relation to said combustion chamber and connected in fluid communication between said condenser and said water supply, the temperature of said water supply being raised due to heat transfer from said combustion chamber during combustion therein.

2. A combustion engine as in claim 1 wherein said condenser comprises a forced flow means structured to vent non-condensables to the atmosphere.

3. A combustion engine as in claim 2 wherein said valve means includes a first intake valve structured to permit entry of hot gas from said combustion chamber into said cylinder.

4. A combustion engine as in claim 3 wherein said valve means further includes a second exhaust valve structured to permit exhaust fluid to exit said cylinder after compression of said hot gas and steam combination.

5. A combustion engine as in claim 4 further comprising hot gas ducts connected in fluid communication between said combustion chamber and said piston and cylinder assembly and further connected in fluid communication with said piston and cylinder assembly and said turbine and being structured to permit passage of said hot gasses and said exhaust fluid therethrough.

6. A combustion engine as in claim 5 wherein said hot gas ducts include a layer of thermal insulation in surrounding relation to an outer exposed surface and adapted to prevent loss of heat therein.

7. A combustion engine as in claim 6 wherein said combustion chamber includes a layer of thermal insulation surrounding an outer exposed surface thereof, said layer of thermal insulation preventing loss of heat from within said combustion chamber.

8. A combustion engine as in claim 1 wherein said valve means is cooperatively structured with said water injector means for introduction of water therefrom during closing of said first intake valve and immediately prior to said piston reaching a top dead center position during a compression stroke thereof and prior to opening of said second exhaust valve.

9. A combustion engine as in claim 1 wherein said power takeoff comprises a crank shaft of a vehicle.

10. A combustion engine as in claim 2 wherein said forced flow means includes a vacuum pump attached to said condenser assembly and structured to vent non-condensables to the atmosphere.

* * * * *